United States Patent
Enders (10) Patent No.: US 6,951,348 B2
(45) Date of Patent: Oct. 4, 2005

(54) RIGID AIRBAG PLATE ATTACHMENT SYSTEM

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 40 days.

(21) Appl. No.: 10/280,613

(22) Filed: Oct. 24, 2002

(65) Prior Publication Data

US 2004/0080144 A1 Apr. 29, 2004

(51) Int. Cl.⁷ .............................................. B60R 21/16
(52) U.S. Cl. ................................................. 280/728.2
(58) Field of Search .................. 280/728.2, 728.3, 280/731, 732, 751, 752; 297/488; 296/70

(56) References Cited

U.S. PATENT DOCUMENTS

| | | | |
|---|---|---|---|
| 3,799,573 A | | 3/1974 | McDonald |
| 5,333,897 A | * | 8/1994 | Landis et al. ............ 280/728.2 |
| 5,380,037 A | * | 1/1995 | Worrell et al. ........... 280/728.2 |
| 5,597,179 A | * | 1/1997 | Kornhauser ................ 280/735 |
| 5,630,611 A | * | 5/1997 | Goss et al. .............. 280/728.2 |
| 5,630,621 A | * | 5/1997 | Schneider ................... 280/753 |
| 5,639,113 A | | 6/1997 | Goss et al. .............. 280/728.2 |
| 5,762,359 A | | 6/1998 | Webber et al. ........... 280/728.2 |
| 5,924,831 A | | 7/1999 | Ricks et al. ................. 411/508 |
| 6,029,992 A | | 2/2000 | Vendely et al. .......... 280/728.2 |
| 6,092,832 A | | 7/2000 | Worrell et al. ........... 280/728.2 |
| 6,196,573 B1 | | 3/2001 | Worrell et al. ........... 280/728.2 |
| 6,250,665 B1 | | 6/2001 | Sutherland et al. |
| 6,325,408 B1 | * | 12/2001 | Ford ....................... 280/728.2 |
| 6,554,312 B2 | * | 4/2003 | Sakane et al. ........... 280/728.2 |
| 6,712,383 B2 | * | 3/2004 | Asic et al. ............... 280/728.2 |
| 2002/0125708 A1 | | 9/2002 | Schneider |

* cited by examiner

Primary Examiner—Faye M. Fleming
(74) Attorney, Agent, or Firm—Sally J. Brown

(57) ABSTRACT

A module configured to be mounted in a vehicle instrument panel is disclosed. In one embodiment, the module has a reaction plate and a plurality of snap locking fasteners that extend from the reaction plate and are engagable to a vehicle mounting member. The module may be used to attach an airbag to an instrument panel. The module provides for a module cover without fastener openings or holes. The invention also includes a module having a mounting bracket that is pivotally attachable to a vehicle mounting member. The pivotal attachment may include tongue and groove members.

16 Claims, 5 Drawing Sheets

Fig. 4

RIGID AIRBAG PLATE ATTACHMENT SYSTEM

BACKGROUND OF THE INVENTION

1. Field of the Invention

The present invention relates to airbag module attachment systems. More specifically, the present invention relates to an airbag module attachment system that does not require fastener openings in the cover on the instrument panel.

2. Technical Background

Various occupant restraining systems, such as airbags, have proven effective in preventing injury and death during automobile collisions. As a result, multiple systems are currently being employed in order to adequately restrain a vehicle occupant. One such system is the knee bolstering airbag. A knee bolstering airbag is an airbag module configured to expand or inflate during impact to prevent the occupant from "submarining" or sliding under the steering column. The knee bolstering airbag engages the knees of the occupant to keep the occupant upright and allowing the steering wheel mounted airbag or dashboard mounted airbag to attenuate the occupant's motion.

Knee bolstering airbags are typically mounted in the instrument panel of an automobile. The knee bolstering airbags may be mounted below the steering column or below the passenger side dashboard and are typically visible to the vehicle occupants. Currently, many knee bolstering airbags are attached to the instrument panel through conventional fasteners, such as screws and rivets. However, in order to attach a knee bolstering airbag to an instrument panel with screws or rivets, fastener openings are necessary in the airbag cover. The fastener openings in the covers are required to properly secure the fasteners during attachment of the module to the instrument panel.

Unfortunately, the fastener openings often create a poor appearance in the highly visible instrument panel. Often, four or more fastener openings are required in a cover to securely attach an airbag module. Each additional fastener opening detracts from the overall appearance of the instrument panel. Some attempts to conceal the fastener openings have been made by employing plugs that may be inserted into the fastener openings of the cover. However, while plugs do provide an improved appearance, the covers do not have a uniform smooth surface. Furthermore, during the life of the automobile the plugs may fall out of the fastener openings, again creating a poor appearance.

In order to conceal fastener openings, some fastener openings are being located in the lower portions of the instrument panel, such that the fastener opening are not visible to the vehicle occupants. However, it may not always be possible to position the fastener openings at a location that is not visible to the occupants. Furthermore, positioning the fastener openings below the instrument panel can increase the difficulty in attaching the module to the instrument panel because of the limited workspace.

Another problem with current knee bolstering airbags is the position of the fasteners relative to the airbag. In some instances, the fasteners are positioned directly through the airbag itself. Such fastener configurations require complex openings in the airbag for the fasteners that allow passage of the fastener and inflation of the airbag. Fastener openings in the airbag can increase the cost and complexity of the airbag. Fastener openings in the airbag are particularly problematic with metal foil airbags, where a series of sheets of metal are formed into an inflatable pressure vessel.

In order to avoid fastener openings in the airbag, fastener openings have been pushed to the perimeter of the airbags. However, by pushing the fastener openings to the perimeter of the airbag, the opening in the instrument panel for the airbag module must be increased. Large openings in the instrument panel can also have a poor appearance. Alternatively, the airbag may be folded into a smaller outline and bulkier depth to fit within a smaller area. However, the bulk of the airbag may require a deeper opening in the instrument panel and may also interfere with deployment of the airbag.

Therefore, what is needed in the art is an instrument panel mountable airbag module that has no fastener openings in the cover. What is also needed in the art is a mounting system for attaching a knee bolstering airbag employing snap-locking fasteners. What is further need in the art is a knee bolstering airbag that is positionable on a base member independent of the position of the fasteners.

There is a further need in the art for knee bolstering airbag that is attachable to an instrument panel with minimal steps and tools. There is also a need for a knee bolstering airbag attachment system that is attachable with snap-locking fasteners. A need further exists for an airbag module that minimizes rattling of the airbag module. Such an attachment system and airbag module are disclosed herein.

BRIEF SUMMARY OF THE INVENTION

The apparatus and method of the present invention have been developed in response to the present state-of-the-art, and, in particular, in response to problems and needs in the art that have not yet been fully resolved by currently available airbag inflator systems. Thus, it is an overall objective of the present invention to provide an airbag module mounting system that is attachable in a vehicle without the need for fastener openings in the module cover or fastener openings in the airbag.

A system for mounting an instrument panel module, such as a knee bolstering airbag, is comprised of a reaction plate having a front surface and a rear surface. A plurality of snap-locking fasteners extend from the rear surface of the reaction plate, where the snap-locking fasteners are configured to attach to a vehicle mounting member. The fasteners may include a male end and a female end, where the male end extends from the rear surface of the reaction plate and the female end is attachable to the vehicle mounting member.

By employing snap-locking fasteners that extend from the rear surface of the reaction plate, an airbag or other similar module member may be positioned on the reaction plate independently of the location of the fasteners. Such an attachment configuration eliminates the need for fastener holes or openings in the airbag. The configuration also prevents the need to compress the airbag to fit within the perimeter of the reaction plate fasteners.

The reaction plate may have a plurality of stops extending from the rear surface of the reaction plate. The stops are configured to be abuttable against the vehicle mounting member. The stops may provide a biasing force away from an engaged positioned of the reaction plate and the vehicle mounting member such that a secure engagement is achieved. The secure engagement may be assisted by a plurality of elastic spacers located on the stops which may provide a biasing force when compressed. The stops may be stamped into a metal reaction plate or may be molded into a plastic reaction plate.

A variation of the module may include a mounting bracket coupled to the rear surface of the reaction plate. Various configurations of the mounting bracket allow the module to be pivotably attachable to the vehicle mounting member. The pivotal connection may be achieved by a tongue and groove attachment system at a first end of the mounting bracket. Once the tongue and groove members are attached, the module may be pivoted into an assembled position.

The second end of the mounting bracket may include an attachment member that locks the module to the vehicle mounting member. The attachment member may be a snap-locking fastener that attaches to the vehicle mounting member without the need to access the fasteners through the module cover. Such a configuration allows the airbag cover to be visually smoothed and free from fastener openings. However, traditional rivets or screw fasteners may be employed to attach the second end of the bracket to the vehicle mounting member, where the fastener openings are located in a position that is out of sight to a vehicle occupant.

In another variation, the reaction plate may employ a mounting bracket having a tongue or groove attachment member at one end and an arched hand at the other end. The arched hand may engage and pivot on the vehicle mounting member. A mounting member stop may be placed on the vehicle mounting member to limit the rotation of the arched hand. The arched hand may allow the module to rotate into an assembled configuration where the tongue or groove attachment member is coupled to a corresponding tongue or groove attachment member on the vehicle mounting member. Alternatively, the tongue and groove attachment members may be replaced by snap-locking fasteners or other similar fasteners.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting in scope. The invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–5, where like reference numbers indicate identical or functionally similar elements. The members of the present invention, as generally described and illustrated in the figures, may be implemented in a wide variety of configurations. Thus, the following more detailed description of the embodiments of the system and method of the present invention, as represented in the figures, is not intended to limit the scope of the invention as claimed, but is merely representative of presently preferred embodiments of the invention.

Figure 1:
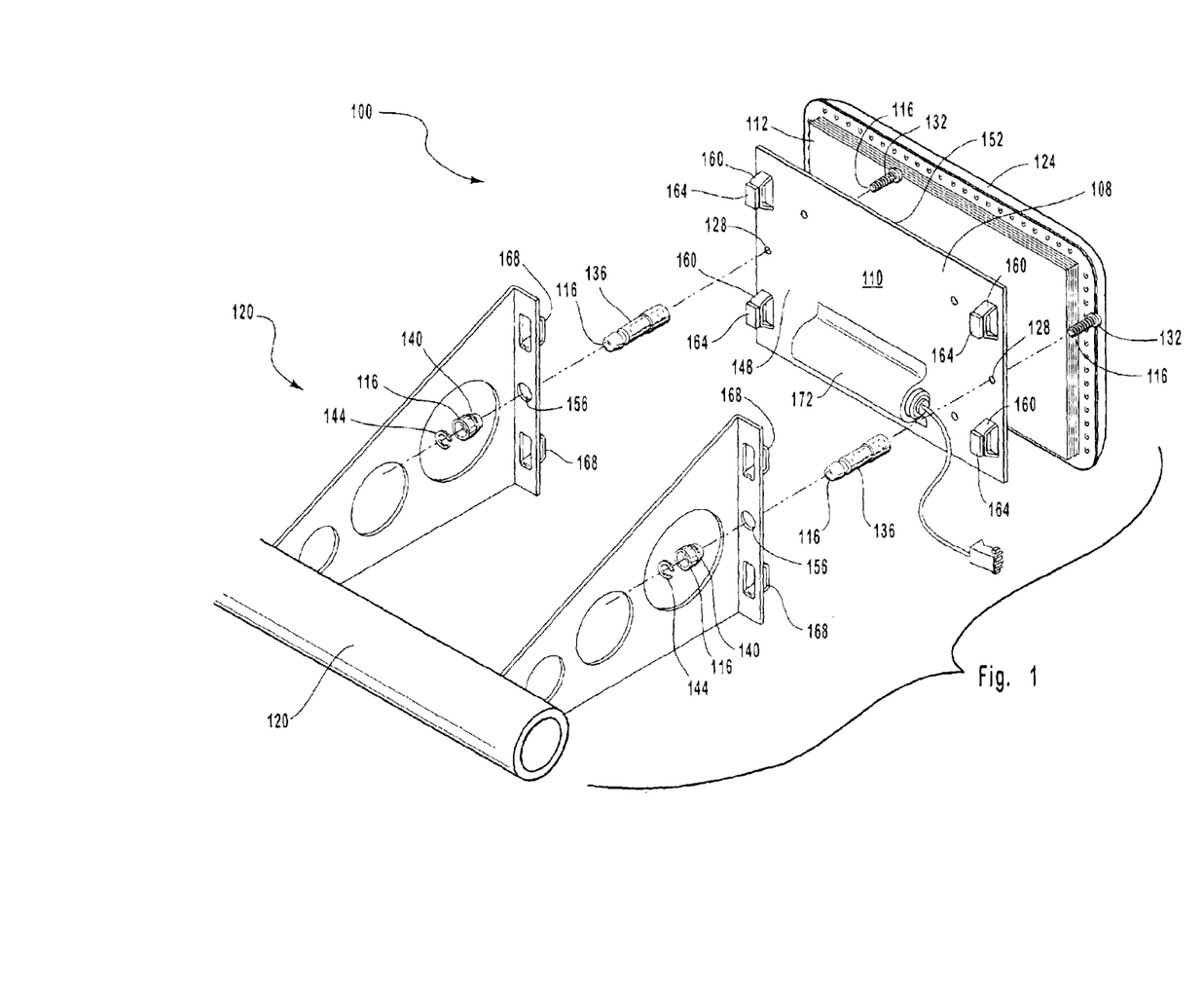
FIG. 1 is an exploded assembly view of a knee airbag module according to the present invention.

Referring now to FIG. 1, an exploded assembly view of a knee airbag module 100 is illustrated. The knee airbag module 100 has a base member 108, an airbag 112, and a plurality of fasteners 116. The base member 108 and the fasteners 116 are configured to attach the airbag 112 to a vehicle mounting member 120 without the need for openings in the airbag 112 or openings in the airbag cover 124. Thus, the cover 124 may be made to be generally smooth to conceal the airbag 112 and the base member 108 in an aesthetically pleasing manner.

The base member 108 may be a generic attachment mechanism configured to support the knee bolstering airbag 112. In embodiment shown in FIG. 1, the base member 108 is a reaction plate 110. A reaction plate 110 is generally a rigid structure configured to support the airbag 112 for attachment and during deployment. The reaction plate 110 may be made of a metal or plastic material where the reaction plate 110 is sufficiently rigid to provide a reaction point for deploying an airbag 112. The base member 108 may include several embodiments other than a reaction plate 110. Thus, reference to a reaction plate 110 herein is intended to include other possible base members 108 that may be employed.

A plurality of fastener openings 128 are located in the reaction plate 110, where a plurality of fasteners 116 extend from the reaction plate 110. The fasteners 116 allow the reaction plate 110 to be attached to a vehicle mounting member 120. The reaction plate 110 may incorporate various opening configurations according to the type and number of fasteners 116 employed.

In the module 100 illustrated in FIG. 1, the reaction plate 110 has two fastener openings 128 that are capable of receiving various fastener configurations. In one embodiment, the fasteners 116 are comprised of a clinch stud 132, a male snap plug 136, a snap ring retainer 140, and snap ring 144. The clinch studs 132 are configured to engage the male snap plugs 136 through the reaction plate 110. The clinch studs 132 may have a threaded end that engages the male snap plugs 136, such that the male snap plugs 136 extend from the rear surface 148 of the reaction plate 110. The clinch studs 132 may also have a low-profile fastener head to allow the front surface 152 of the reaction plate 110 to remain generally flat.

The low-profile of the front surface 152 of the reaction plate 110 allows the knee airbag 112 to be attached without interference or alteration of the operation of the airbag 112. Particularly, the present invention has application in the mounting of metal foil airbags 112. The metal foil airbag 112 is a pressure vessel made of various metal sheets. The metal foil airbag 112 is attachable to the reaction plate 110 at a position on top of the fasteners 116 and without the need to position the fasteners 116 through the airbag 112. Thus, the airbag 112 may be positionable on the reaction plate 110 independent of the location of the fasteners 116.

By employing fasteners 116 that do not require holes or openings in the airbag 112, an airbag module 100 may be made attachable without the need to insert or engage fasteners 116 through openings in the airbag cover 124. Eliminating the openings in the airbag cover 124 can improve the aesthetic appearance of the airbag cover 124. Also, eliminating the openings in the airbag 112 may reduce the bulk of cost and complexity of the airbag 112. Thus, the airbag module 100 may be provided as a unit having a generally solid airbag cover 124 with a plurality of snap-locking fasteners 116 extending from the rear of the module 100.

With the fasteners 116 extending from the rear surface 148 of the reaction plate 110, the airbag module 100 may be snap-locked to an instrument panel or vehicle mounting member 120. The vehicle mounting member 120 may have attachment systems that correspond to the type of fasteners 116 in the airbag module 100. For example, as illustrated in FIG. 1, a snap ring retainer 140 and a snap ring 144 may be attached to the vehicle mounting member 120 in order to receive the fasteners extending from the rear surface 148 of the reaction plate 110. The snap ring retainers 140 may be snap-locked into mounting member openings 156 located in the vehicle mounting member 120. The snap ring retainers 140 and the snap rings 144 may provide corresponding snap-locking members to attach to the fasteners 116 extending from the rear surface 148 of the reaction plate 110.

Various numbers of fasteners 116 may be used to attach the airbag module 100 to the vehicle mounting member 120. In the embodiment illustrated in FIG. 1, two fasteners 116 are used to attach the airbag module 100 to the vehicle mounting member 120. In order to provide a secure support with minimal vibrations, a plurality of stops 160 are located on the rear surface 148 of the reaction plate 110. The stops 160 may be sections elevated above the rear surface 148 of the reaction plate 110. The stops 160 may be stamped into a metal reaction plate 110 or molded into a plastic reaction plate 110. Other embodiments of the stops 160 may be separate members that are attached to the reaction plate 110.

The stops 160 are configured to engage and abut against the vehicle mounting member 120. As the stops 160 abut against the vehicle mounting member 120, the stops 160 prevent the reaction plate 110 and the airbag module 100 from pivoting. The stops 160 may also be sized such that the height of the stops 160 is larger than the distance between the reaction plate 110 and the vehicle mounting member 120 established by the fasteners 116. When the fasteners 116 lock to the vehicle mounting member 120, the stops 160 will be compressed against the vehicle mounting member 120 to prevent the airbag module 100 from rattling.

The interference fit between the stops 160 and the vehicle mounting member 120 may also be accomplished through a plurality of elastic spacers 164 located on top of the stops 160. The elastic spacers 164 may be made of material, such as rubber, that resists compression. As the reaction plate 110 and the stops 160 are compressed against the vehicle mounting member 120, the elastic spacers 164 will provide a biasing force against the reaction plate 110 and the stops 160 in a direction away from the vehicle mounting member 120. Thus, the elastic spacers 164 may dampen the vibrations that may be caused by a rigid attachment of the airbag module 100.

The vehicle mounting member 120 may also include a plurality of stops 168. The stops 168 on the vehicle mounting member 120 may be configured to engage corresponding reaction plate stops 160, as described above. Alternatively, the reaction plate stops 160 may be omitted and the reaction plate 110 may abut against the stops 168 on the vehicle mounting member 120. Furthermore, the elastic spacers 164 may be placed on only one or on both of the stops 160, 168.

The stops 160, 168 also serve the function of creating a space between the reaction plate 110 and a mounting member 120 to accommodate various airbag module components. For example, the reaction plate 110 may have an initiator bracket 172 extending above the rear surface 148 of the reaction plate 110. By providing stops 160, 168 on the reaction plate 110 or on the vehicle mounting members 120, a space to accommodate the initiator bracket 172 is created.

While FIG. 1 illustrates one fastener 116 embodiment that may be employed, other fasteners that perform similar functions may also be employed. For example, in FIG. 2 fasteners 216 may have a stub at one end that is press-fit into the rear surface 248 of the reaction plate 210. Other fasteners may be integrally formed into the reaction plate (not shown), which may be accomplished through a stamping or plastic molding process. In yet another fastener embodiment, the fasteners may extend from the vehicle mounting member to engage the reaction plate. One having ordinary skill in the art will recognize that various other fastener embodiments may be employed to attach the reaction plate 210 to a vehicle mounting member 220, while not requiring undesirable modifications to the airbag 212.

Figure 2:
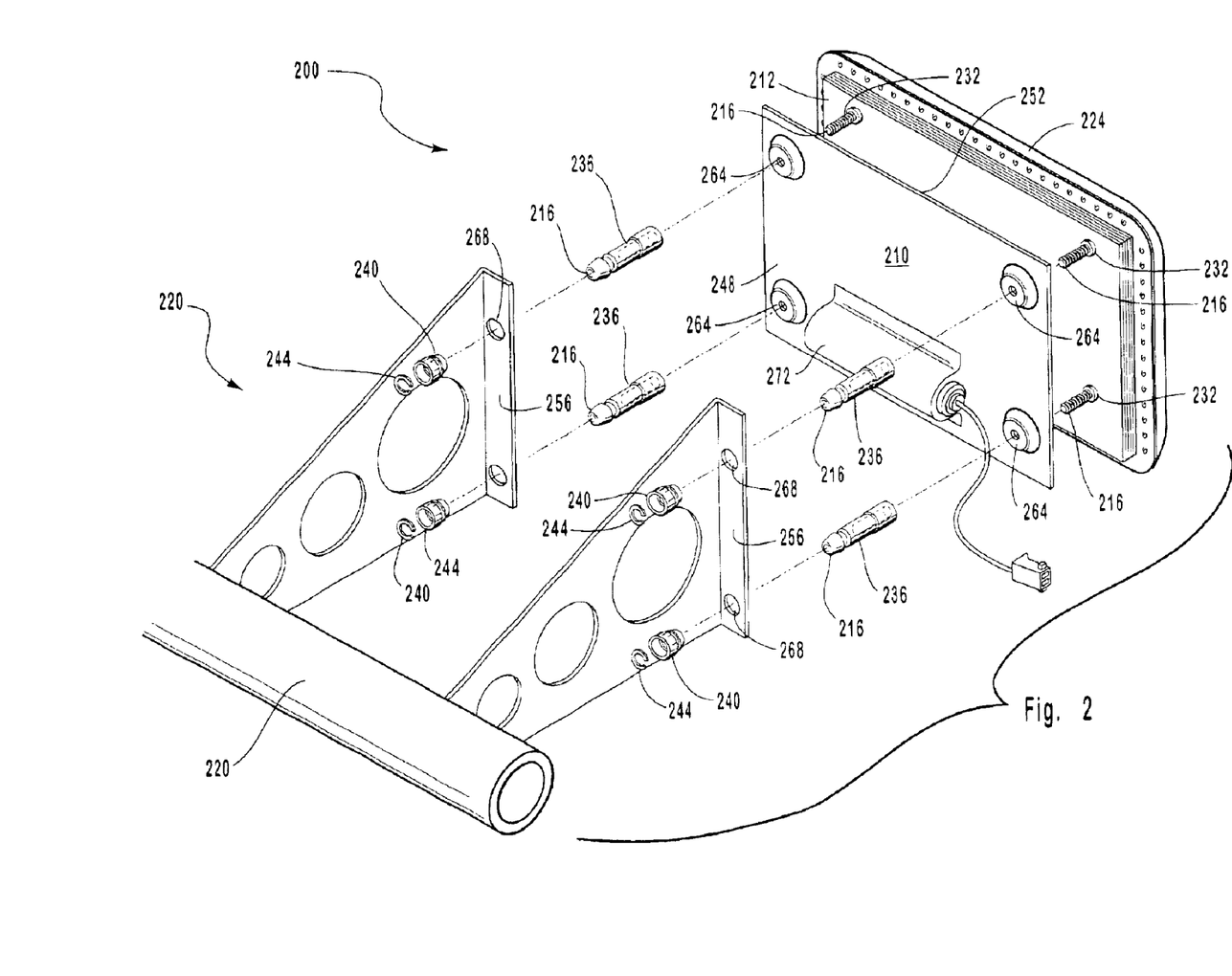
FIG. 2 is an exploded assembly view of a knee airbag module according to another embodiment of the present invention.

The airbag module 200 of FIG. 2 also illustrates a reaction plate 210 not employing stops. Instead, the reaction plate 210 has four snap-locking fasteners 216 extending from each of the corners of the reaction plate 210. The four snap-locking fasteners 216 secure the four corners of the reaction plate 210 and prevent the reaction plate 210 from pivoting. The four snap-locking fastener 216 function similarly to the stop 160 of FIG. 1 by limiting the motion of the reaction plate 210. However, employing four fasteners 216 require more parts and assembly procedures than are required with only two fasteners 116 and multiple stamped stops 160, as in FIG. 1.

Furthermore, elastic spacers 264 may be placed between the reaction plate 210 and the vehicle mounting member 220 to dampen any vibrations and rattling that may occur between the airbag module 210 and the vehicle mounting member 220. The compression of the elastic spacers 264 provides a biasing force between the reaction plate 210 and the vehicle mounting member 220. Additionally, the elastic spacers 264 may be ring shaped to allow the fasteners 216 to pass through the elastic spacers 264 and to hold the elastic spacers 264 in place.

Figure 3:
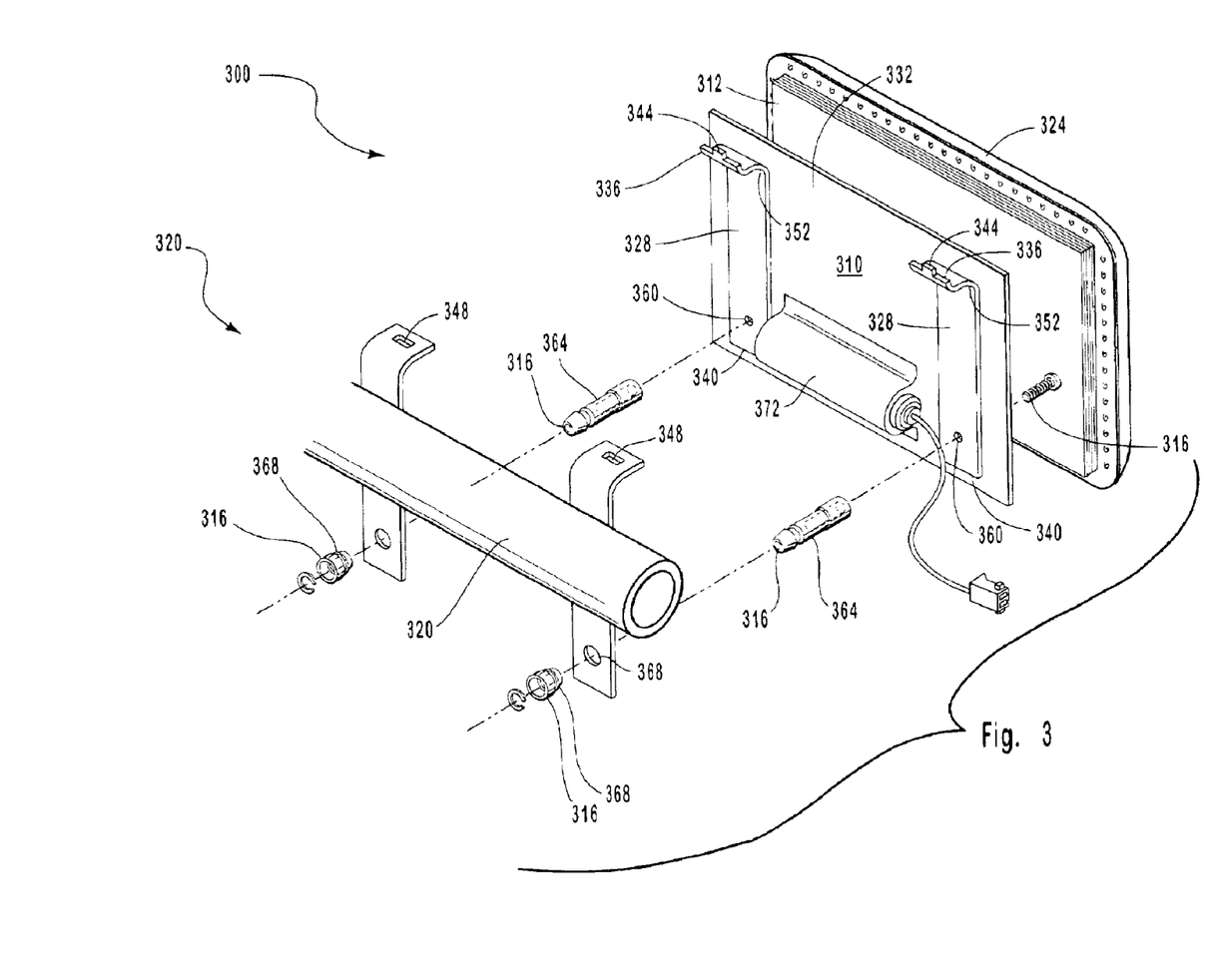
FIG. 3 is an exploded assembly view of a knee airbag module having a tongue and groove mounting bracket.

Referring now to FIG. 3, another embodiment of a module 300 is illustrated. The module 300 is attachable to an instrument panel without the need for fastener openings in the cover 324. The module 300 may be an airbag 312 module, such as a knee bolstering airbag 312. The module 300 is configured to allow attachment of the module 300 to a vehicle mounting member 320 without fastener openings in the cover 324 or without fastener openings in the airbag 312.

The module 300 may have a plurality of mounting brackets 328 located on the rear surface 332 of the base member or reaction plate 310. The mounting brackets 328 may be separate members that are attached to the reaction plate 310 or may be integrally formed with the reaction plate 310. For example, the mounting brackets 328 may be formed separately from the reaction plate 310 and then fastened to the rear surface 332 of the reaction plate 310, as illustrated in FIG. 3. Alternatively, the mounting brackets 328 may be appendages and openings that are molded or stamped into the reaction plate 310.

The mounting brackets 328 may have a first end 336 and the second end 340. In one variation, the mounting brackets 328 have a tongue or groove member at the first end 336. In the module 300 illustrated in FIG. 3, the first ends 336 of the mounting brackets 328 have tongue members 344 that correspond to groove member 348 located on the vehicle mounting member 320. Alternatively, the groove members 348 may be located on the first ends 336 of the mounting brackets 328 and the tongue members 344 may be located on the vehicle mounting member 320.

The mounting brackets 328 may also include a bent section 352 at the first end 336. The bent section 352 allows the tongue member 344 to be positioned at a distance from the reaction plate 310. The bending of the first end 336 away from the reaction plate 310 gives the tongue member 344 space to attach to the groove member 348. Additionally, the bent section 352 can define the distance between the reaction plate 310 and the vehicle mounting member 320. The distance between the reaction plate 310 and the vehicle mounting member 320 can be sized to allow the presence of an inflator bracket 372 or other similar members on the reaction plate 310 or on the vehicle mounting member 320.

The second end 340 of the mounting brackets 328 may have a fastener opening 360 for attachment of a fastener 316, or other similar fastener mounting mechanism. Alternatively, fasteners 316 may be integrally formed into the second ends 340 of the mounting members 320. In the module 300 illustrated in FIG. 3, the fasteners 316 are similar to the fasteners illustrated in FIG. 1, having a male end 364 attachable to a female end 368.

Figure 4:
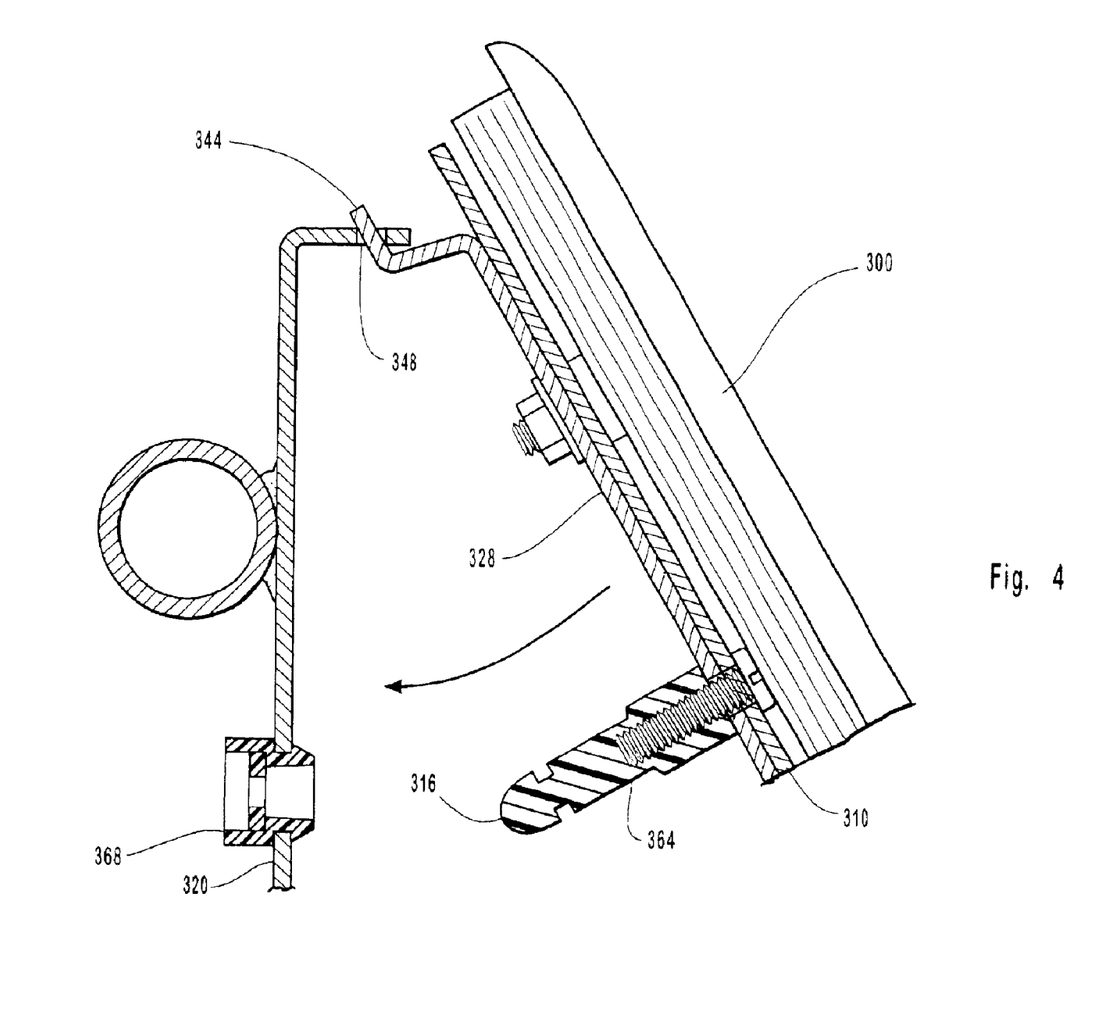
FIG. 4 is a cross-sectional view of an exploded assembly view of an airbag module employing a tongue and groove mounting bracket.

Referring now to FIG. 4, the method for attaching the module 300 to the vehicle mounting member 320 is illustrated. First, the cover 324 and the airbag 312 are attached to the reaction plate 310, creating a single module 300 having a cover 324 that is visually smooth and free of additional openings and parts. The cover 324 may be attached to the reaction plate 310 by fasteners, snaps, or thermoplastic welding.

When assembled, the mounting brackets 328 are configured to extend from the rear surface 332 of the reaction plate 300 and the module 300. The module 300 is aligned to the vehicle mounting member 320, such that the tongue member 344 is positioned below the groove member 348. The tongue member 344 is then inserted into the groove member 348, such that the module 300 is allowed to pivot relative to the vehicle mounting member 320. Similarly, in an embodiment where the mounting brackets 328 have the groove members 348 and the vehicle mounting member 320 has the tongue members 344, the groove members 348 are placed over the tongue members 344, such that the module 300 pivots relative to the vehicle mounting member 320.

Once the module 300 is attached to the vehicle mounting members 320 by the mounting brackets 328, the non-attached end or the second end 340 of the module 300 is pivoted toward the vehicle mounting member 320. In the module 300 illustrated in FIG. 4, the male end 364 of the fastener 316 pivots towards the female end 368 of the fastener 316. As the module 300 pivots toward the vehicle mounting member 320, the male end 364 aligns with the female end 368 and the fastener 316 locks together.

The tongue 344 and groove 348 engagement and the snap-locking fastener 316 provide a secure attachment for the module 300. The secure attachment is created by the interference between the tongue 344 and groove 348 members, such that a lateral force on the module 300 will cause the tongue members 344 to engage the side of the groove members 348. Thus, the attachment of the module 300 will be stronger than would otherwise be possible with snap-locking fasteners 316 alone. The use of the tongue 344 and groove 348 members also allows the module 300 to more easily align to the vehicle mounting members 320.

As noted above, the location of the tongue member 344 and the groove member 348 may be transposed between the mounting bracket 328 and the vehicle mounting member 320. Furthermore, other configurations that function in a manner similar to the tongue 344 and groove 348 members may be incorporated. For example, hook and loop attachment members may be provided to allow the module 300 to pivotally attach to the vehicle mounting member 320. Another configuration may include a partially closed channel that attaches to and pivots on a corresponding rod. Additionally, the reaction plate 310 may have various numbers of mounting brackets 328. A single mounting bracket 328 having a generally elongated tongue 344 or groove 348 member may be incorporated. Alternatively three or more mounting brackets 328 may be used.

Figure 5:
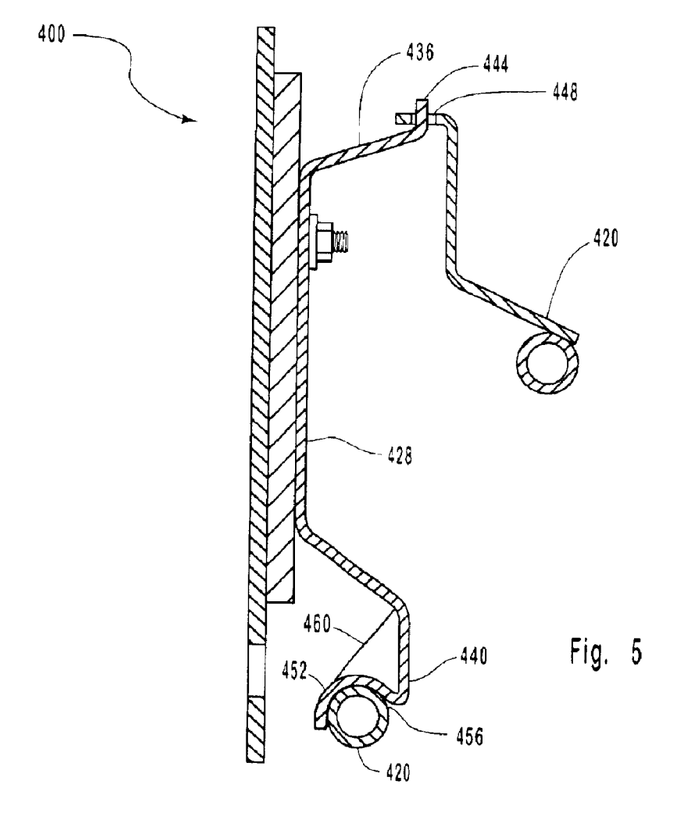
FIG. 5 is a cross-sectional view of another embodiment of an airbag module employing a tongue and groove mounting bracket.

Referring now to FIG. 5, a system for attaching a module 400 to a vehicle mounting member 420 is illustrated. The module 400 has mounting bracket 428 similar to the mounting bracket 328 illustrated in FIG. 4. However, the mounting bracket 428 of FIG. 5 has a tongue 444 or groove 448 member at the first end 436 and the mounting bracket 428 has an arched hand 452 at the second end 440. The arched hand 452 is configured to engage a portion of the vehicle mounting member 420. In one embodiment, the vehicle mounting member 420 has a generally round structure on which the corresponding arched hand 452 can pivot. As various other shapes of the vehicle mounting member 420 are possible, so to are the number of shapes of the arched hand 452.

The module 400 employing an arched hand 452 may be attached to a vehicle mounting member 420 by first placing the arched hand 452 on to a pivoting location 456 of the vehicle mounting member 420. Once attached, the module 400 may pivot toward the vehicle mounting member 400 where the first end 436 of the bracket 428 attaches to the vehicle mounting member 420.

The first end 436 of the mounting bracket 428 may attach to the vehicle mounting member 420 through various fasteners. For example, a tongue 444 and groove 448 attachment system may be located at the first end 436. The tongue 444 and groove 448 attachment system locks together when the first end 436 is biased toward the vehicle mounting member 420. Alternatively, a snap-locking fastener may be located at the first end 436 to lock to the vehicle mounting member 420.

Furthermore, the mounting system may include a mounting member stop 460 to limit the pivotal motion of the arched hand 452. The mounting member stop 460 is affixed to the vehicle mount member 420. The mounting member stop 460 limits and resists travel of the module 400 under the force of knee impact. As the arched hand 452 pivots about the pivotal location 456 of the vehicle mounting member 420, the mounting member stop 460 engages a portion of the arched hand 452 or the second end 440 of the mounting bracket 428. When the arched hand 452 engages the mounting member stop 460, the arched hand 452 will resist rotation. As the module 400 is pivoted beyond the point where the mounting member stop 460 engages the arched hand 452, the first end 436 of the mounting bracket 428 will deflect. The deflection of the mounting bracket 428 will function similar to a spring, and bias the module 400 away from the vehicle mounting member 420. When the first end 436 is locked to the vehicle mounting member 420, the mounting brackets 428 will tend to spring away from the vehicle mounting member 420, creating a snug and secure engagement.

Additionally, the module 400 may be attached to the vehicle mounting member 420 in the opposite order. First, the first end 436, having a pivotal tongue 444 and groove 448 engagement may be attached together. Then, the module 400 may be pivoted towards the second end 440. The arched hand 452 may be forced between the mounting member stop 460 and the pivotal location 456 of the vehicle mounting member 420. The shape of the arched hand 452 will cause the second end 440 of the mounting bracket 428 to be locked between the mounting member stop 460 and the pivotal location 456.

While various embodiments of the module attachment system are possible, the present invention broadly comprises a system for attaching a module to an instrument panel without the need for openings or fasteners in the cover of the module. The system also allows an airbag, such as a metal foil airbag, to be attached to a reaction plate independent of the position of the fasteners in the reaction plate. Thus, no openings or holes are required to be located in the airbag.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A mounting system for attaching a knee bolstering airbag to an instrument panel, comprising:
    a reaction plate having a front surface and a rear surface wherein the reaction plate has a plurality of stops and wherein the stops are stamped into the reaction plate; and
    a plurality of snap-locking fasteners extending from the rear surface of the reaction plate, such that the knee bolstering airbag is positionable independently of the position of the snap-locking fasteners.

2. The mounting system, as recited in claim 1, wherein the knee bolstering airbag is a metal foil airbag.

3. The mounting system, as recited in claim 1, wherein the stops are abuttable against the vehicle mounting member.

4. The mounting system, as recited in claim 1, wherein elastic spacers are located on the stops.

5. The mounting system, as recited in claim 1, wherein two snap-locking fasteners extend from the reaction plate.

6. The mounting system, as recited in claim 1, wherein the snap-locking fasteners have a male end.

7. The mounting system, as recited in claim 6, wherein the male end extends away from the reaction plate.

8. The mounting system, as recited in claim 1, wherein the snap-locking fasteners lock to the vehicle mounting structure.

9. The mounting system, as recited in claim 1, wherein the snap-locking fasteners lock to the reaction plate.

10. The mounting system, as recited in claim 1, wherein the knee airbag has an airbag perimeter and the snap-locking fasteners define a fastener perimeter.

11. The mounting system, as recited in claim 10, wherein the airbag perimeter is larger than the fastener perimeter.

12. An instrument panel mountable knee airbag module comprising:
    a reaction plate having a front surface, a rear surface, and a plurality of stops, wherein the plurality of stops are abuttable against a vehicle mounting member;
    a knee airbag coupled to the front surface of the reaction plate; and
    a plurality of snap-locking fasteners extending from the rear surface of the reaction plate that are attachable to the vehicle mounting member, wherein the snap-locking fasteners allow the airbag module to be coupled to the instrument panel such that the fasteners are substantially concealed
    wherein the stops are stamped into the reaction plate.

13. The airbag module, as recited in claim 12, wherein elastic spacers are located on the stops.

14. The airbag module, as recited in claim 12, wherein the snap-locking fasteners have a male end.

15. The airbag module, as recited in claim 12, wherein the knee airbag has an airbag perimeter and the snap-locking fasteners define a fastener perimeter.

16. The airbag module, as recited in claim 15, wherein the airbag perimeter is larger than the fastener perimeter.

* * * * *